US005577847A

United States Patent [19]
Nakamura et al.

[11] Patent Number: 5,577,847
[45] Date of Patent: Nov. 26, 1996

[54] SUPPORTING ARRANGEMENT FOR A BEARING IN AN ELECTRIC MOTOR

[75] Inventors: Kosei Nakamura; Yukio Katsuzawa; Michi Masuya, all of Yamanashi, Japan

[73] Assignee: Fanuc Ltd., Yamanashi, Japan

[21] Appl. No.: 521,446

[22] Filed: Aug. 30, 1995

[30]  Foreign Application Priority Data

Sep. 1, 1994  [JP]  Japan ..................... 6-208737

[51] Int. Cl.$^6$ ................. F16C 23/00; F16C 19/52; F16C 33/78
[52] U.S. Cl. ................ 384/517; 384/462; 384/489; 384/493
[58] Field of Search ..................... 384/493, 462, 384/477, 489, 517, 535, 536, 557, 905

[56]  References Cited

U.S. PATENT DOCUMENTS

| | | | |
|---|---|---|---|
| 2,345,952 | 4/1944 | Smith | 384/905 X |
| 3,214,224 | 10/1965 | Lash | 384/517 |
| 4,551,032 | 11/1985 | Mottershead | 384/517 |
| 4,560,289 | 12/1985 | Wood, III | 384/535 X |

FOREIGN PATENT DOCUMENTS 280532  10/1993  Japan ..................... 384/493

*Primary Examiner*—Thomas R. Hannon
*Attorney, Agent, or Firm*—Nikaido, Marmelstein, Murray & Oram LLP

[57]  ABSTRACT

An improved supporting arrangement for a bearing in an electric motor is provided for preventing the development of fretting corrosion. The electric motor comprises a housing, the housing including a longitudinal axis and bores at either end thereof so that the bores are aligned to the longitudinal axis, a rotating shaft extending along the longitudinal axis through the bores, and bearings for rotationally supporting the rotating shaft at either end thereof, the bearings being provided within the respective bores. The supporting arrangement comprises a support in the form of a ring for supporting the one of the bearings into which the bearing is fitted, the support being fitted into one of the bores and slidable along the longitudinal axis, a pair of O-rings provided between the outer surface of the support and the inner surface of the bore into which the support is fitted, the O-rings being separated from each other by an interval along the longitudinal axis, a lubricant receiving receptacle provided between the pair of O-rings, and lubricant material applied on the outer surface of the support, on the inner surface of the bore, and in the lubricant receiving receptacle.

24 Claims, 3 Drawing Sheets

SUPPORTING ARRANGEMENT FOR A BEARING IN AN ELECTRIC MOTOR

BACKGROUND OF THE INVENTION

1. Field of the Invention

The invention relates to an electric motor, in particular to a supporting arrangement for a bearing in a high speed electric motor.

2. Description of the Related Art

An electrical motor comprises a housing, and a rotating shaft extending through the housing. A stator is provided on the inner surface of the housing. The stator includes a laminated stator core and a system of coils. A rotor is mounted on the rotating shaft. The rotor comprises a laminated rotor core and a conductive portion. The rotating shaft is supported, at either end thereof, in the housing and for rotation, by bearings such as ball bearings.

After the motor starts, the temperature of the motor increases due to the copper loss and the iron loss of the stator and the rotor. The increased temperature results in the thermal expansion of the elements of the motor. On the other hand, after the motor stops, the temperature of the motor decreases. The decreased temperature results in the thermal contraction of the elements. The increasing and decreasing rates of the temperature are not coincident between the stator and the rotor due to, for example, differences of the loss of the stator and the rotor, materials of the stator and the rotor, and the cooling arrangements of the motor.

Thus, a temperature difference appears between the stator and the rotor. The differences in the temperature and the material between the rotor and the stator results in a difference in thermal expansion and contraction of rotor elements, which include the rotor and the shaft, and the stator elements, which include the stator and the housing. The difference in the thermal expansion and contraction takes place, in particular, along the axis of the rotating shaft.

If the bearing cannot move in the axial direction, pressure is applied to the bearings, which can make the bearings deform and seize, due to the thermal expansion and contraction. In order to prevent such damage, in the prior art, a supporting arrangement for the bearings is provided to allow the one of the bearings to move along the axis. The supporting arrangement comprises a support in the form of a ring into which the bearing is fitted. The support is fitted into a bore in the housing. The outer surface of the support and the inner surface of the bore provide sliding surfaces to allow the support to move in the axial direction.

Fretting corrosion, which is well known, is surface damage that occurs between two surfaces of solid bodies which are in close contact, under pressure and subject to a micromechanical vibration or slight relative motion, in particular, in the tangential direction. Fretting corrosion occurs, for example, on the surface of a fitted shaft and between contacting surfaces of a gear coupling. The fretting corrosion results in problems such as seizing, and the generation of vibration and noise. Mechanical factors such as the frequency and amplitude of the vibration, the pressure on the surfaces, and the number of cycles, physical factors such as the material and the surface hardness, and chemical factors such as temperature and lubrication affect the development of fretting corrosion.

As described above, the supporting arrangement for the bearings allows one of the bearings to move in the axial direction. Therefore, fretting corrosion can occur between the outer surface of the support and the inner surface of the bore, into which the support is fitted, due to the vibration of the motor itself or an external device connected to the motor. In particular, if a motor has a rated speed higher than 1,000 RPM, fretting corrosion often occurs due to the high frequency of the vibration.

In the prior art, many improvements have been provided to prevent fretting corrosion. The improvements include, for example, reducing the clearance between the sliding surfaces in the supporting arrangement, providing a chrome plating on one or both surfaces to increase the surface hardness, or providing special lubrication between the surfaces. A lubricant of molybdenum grease is well known that it is effective to reduce the fretting corrosion.

The prior art supporting arrangement for the bearing, which uses the molybdenum lubricant, has a problem in that the lubricant can come out of the clearance between the sliding surfaces due to the vibration and thermal expansion and contraction. Thus, the fretting corrosion would occur a relatively short period after filling the clearance with the molybdenum lubricant. The fretting corrosion in the supporting arrangement makes the bearing subject the pressure due to the thermal expansion of the shaft, which results in the deformation and seizing of the bearing.

SUMMARY OF THE INVENTION

The invention is directed to solve the above problem, and to provide an improved supporting arrangement for a bearing which can prevent the lubricant from coming out of the clearance between the sliding surfaces to restrain the development of fretting corrosion.

According to the invention, there is provided an improved supporting arrangement for a bearing in an electric motor to prevent the development of fretting corrosion. The electric motor comprises a housing, the housing including a longitudinal axis, and bores at either end thereof so that the bores are aligned to the longitudinal axis, a rotating shaft extending along the longitudinal axis through the bores, and bearings for rotationally supporting the rotating shaft at either end thereof, the bearings being provided within the respective bores. The supporting arrangement comprises a support in the form of a ring, for supporting the one of the bearings, into which the bearing is fitted, the support being fitted into one of the bores and slidable along the longitudinal axis, a pair of O-rings provided between the outer surface of the support and the inner surface of the bore into which the support is fitted, the O-rings being separated from each other by an interval along the longitudinal axis, a lubricant receiving receptacle provided between the pair of O-rings, and lubricant material applied on the outer surface of the support, on the inner surface of the bore, and into the lubricant receiving receptacle.

According to another feature of the invention, there is provided an electric motor comprising a housing, the housing including a longitudinal axis, and bores at either end thereof so that the first and second bores are aligned to the longitudinal axis; a rotating shaft extending along the longitudinal axis through the bores; bearings for rotationally supporting the rotating shaft at either end thereof, the bearings being provided within the respective bores; a support in the form of a ring into which one of the bearings is fitted, the support being fitted into one of the bores and slidable along the longitudinal axis; a pair of O-rings provided between the outer surface of the support and the inner surface of the bore in which the support is fitted, the O-rings being separated from each other by an interval along the longitudinal axis; a lubricant receiving receptacle provided between the pair of O-rings; and lubricant material applied on the outer surface of the support, on the inner surface of the bore, and into the lubricant receiving receptacle.

In the preferred embodiment, the lubricant is molybdenum grease.

The inner surface of the bore may include a pair of ring grooves, circumferentially extending along the surface, for receiving the respective O-rings.

The lubricant receiving receptacle may include at least a groove circumferentially extending along the inner surface of the bore.

In another embodiment, chrome plating is provided on the outer surface of the support and/or the inner surface of the bore.

In another embodiment, a means for biasing the support inner direction along the longitudinal axis is provided.

BRIEF DESCRIPTION OF THE DRAWINGS

These and other objects and advantages and further description will now be discussed in connection with the drawings in which.

DESCRIPTION OF THE PREFERRED EMBODIMENTS

Figure 1:
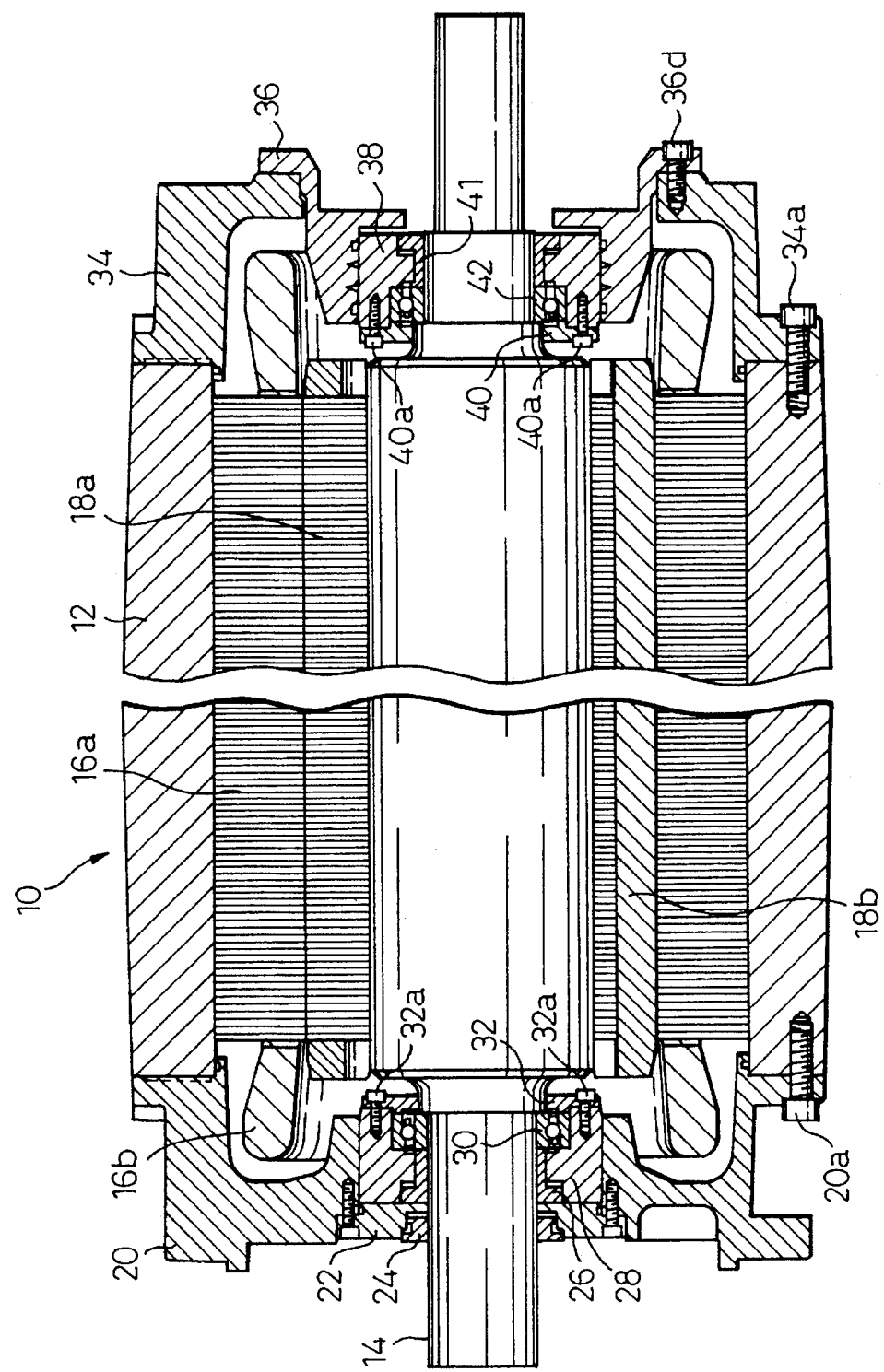
FIG. 1 is a longitudinal section of a motor to which the inventive supporting arrangement for a bearing is applied.
Figure 2:
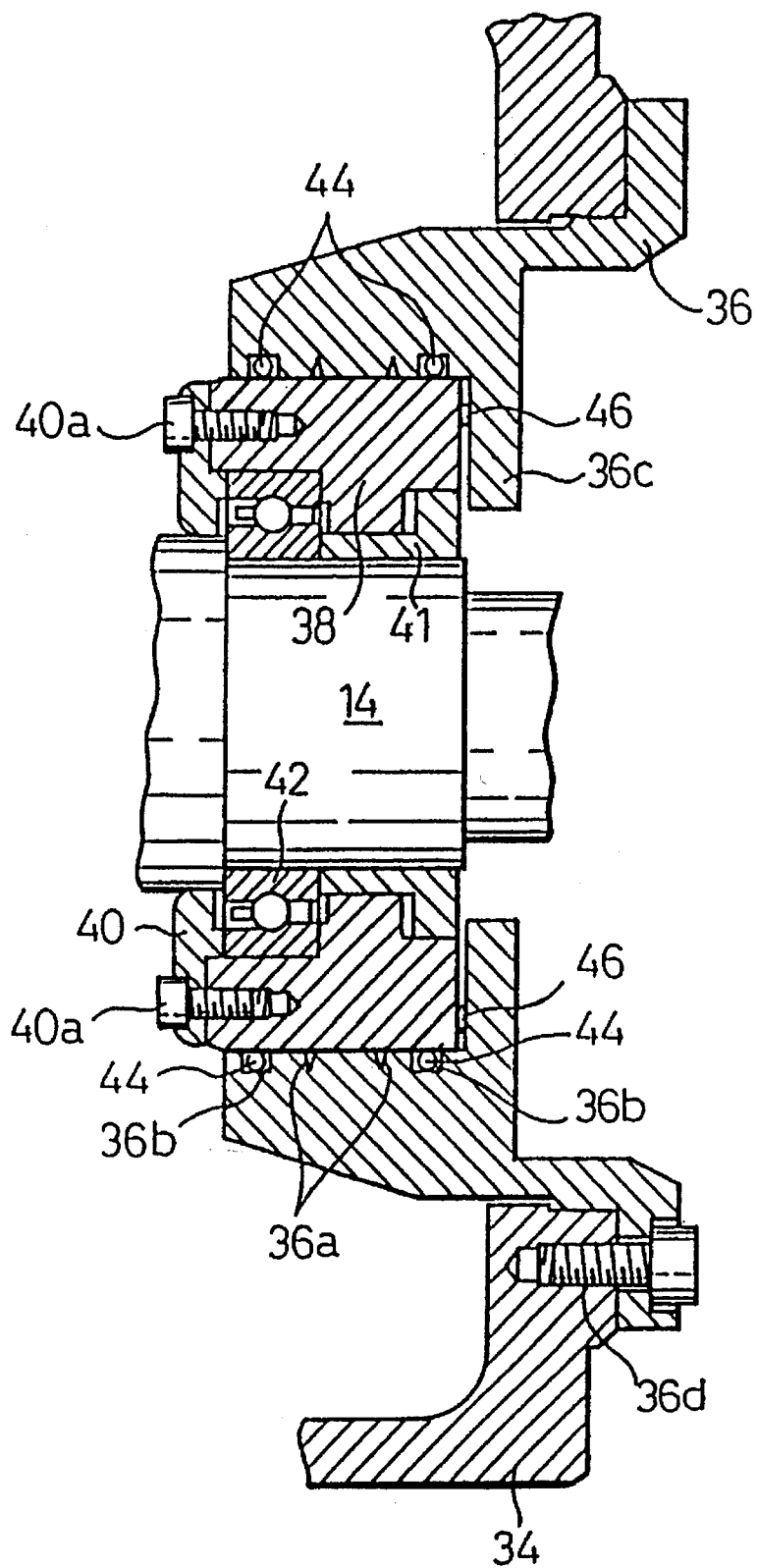
FIG. 2 is an enlarged section of a supporting arrangement for a bearing according to the preferred embodiment of the invention.

With reference to FIGS. 1 and 2, a supporting arrangement according to the preferred embodiment of the invention will be described.

In FIG. 1, an electric motor 10 substantially comprises a cylindrical casing 12 which forms the outer body of the motor 10, end plates 20 and 34 mounted on either end of the motor 10 to close the casing 12, and a shaft 14 extending through the casing 10 and the end plates 20 and 34. The shaft 14 is supported, at each end, by a pair of ball bearings 30 and 42 for rotation. The end plates 20 and 34 are mounted onto the casing by a plurality of bolts 20a and 34a. The casing 12 can be any hollow configuration. The casing 12 and the end plates 20 and 34 provide a housing for the motor 10.

A stator, which comprises a laminated stator core 16a and windings 16b (illustrated only the coil ends), is mounted inside of the casing 12. A rotor, which comprises a laminated rotor core 18a and a conductive portion 18b, is mounted on the shaft 14. A driven device (not shown) is connected to the left end of the shaft 14.

The ball bearing 30 is mounted onto the end plate 20 by a support 28 in the form of a ring. The bearing 30 is fitted onto the shaft 14 and into the support 28. The support 28 is fitted into a bore in the end plate 20. The fit between the outer surface of the support 28 and the bore in the end plate 20 is appropriately selected such that the support 28 cannot move in the axial direction.

Holder rings 26 and 32 are provided to hold the ball bearing 30 relative to the shaft 14 and the support 28. The holder ring 26 is fitted onto the shaft 14. There is provided a clearance between the outer surface of the holder ring 26 and the inner surface of the support 28. The holder ring 32 is mounted to the inner end face of the support 28 by a plurality of bolts 32a. The holder ring 32 further functions to prevent dust from entering into the bearing 30 and lubricant from coming out of the bearing 30. Further, the bearing 30 is separated from the environment by a labyrinth seal 24 and an end cap 22 mounted to the end plates 20 by a plurality of bolts.

The ball bearing 42 is mounted to the end plate 34 by a support 38 in the form of a ring and a flange 36. The flange 36 is mounted to the flange 34 by a plurality of bolts 36d and includes a bore aligned to the axis of the shaft 14. The bearing 30 is fitted onto the shaft 14 and into the support 38. The support is fitted into the bore in the flange 36. The fit between the outer surface of the support 38 and the bore in the flange 36 is appropriately selected such that the support 38 can move in the axial direction. In particular, the fit is selected to provide a clearance of 50 micrometers between the outer surface of the support 38 and the bore in the flange 36. Thus, as the thermal expansion and the contraction, the bearing 42 and the support 38 can move in the axial direction with the outer surface of the support 38 contacting the inner surface of the bore in the flange 36.

Holder rings 40 and 41 are provided to hold the ball bearing 42 relative to the shaft 14 and the support 38. The holder ring 41 is fitted onto the shaft 14. There is provided a clearance between the outer surface of the holder ring 41 and the inner surface of the support 38. The holder ring 40 is mounted to the inner end face of the support 38 by a plurality of bolts 40a. The holder ring 40 further functions to prevent dust from entering into the bearing 42 and lubricant from coming out of the bearing 42.

Figure 3:
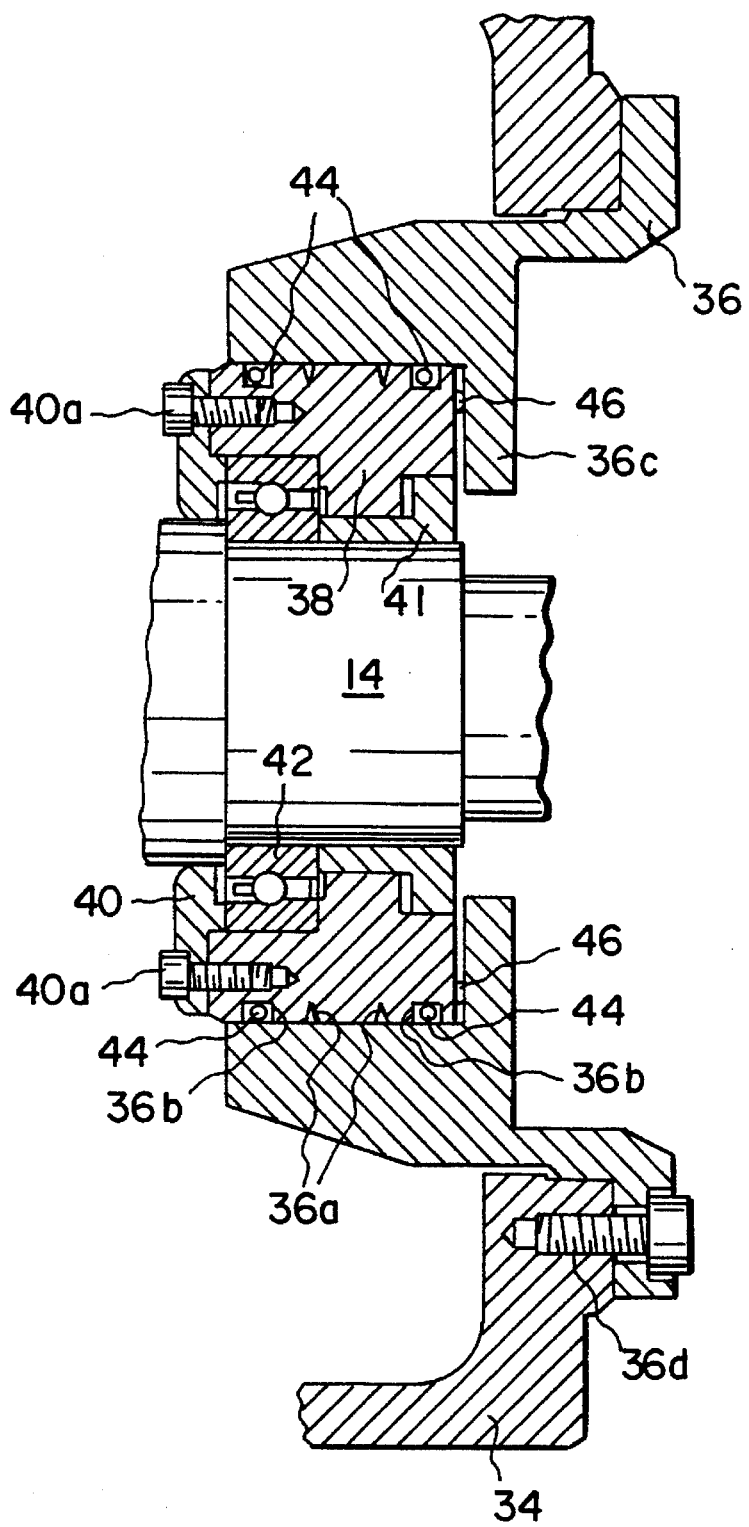
FIG. 3 is an enlarged section of an alternative embodiment of the supporting arrangement.

With reference FIG. 2, which is an enlarged section of the supporting arrangement for the ball bearing 42, the flange 36 includes two ring grooves 36b which extend circumferentially along the inner surface of the bore in the flange 36. An O-ring 44 is provided in each ring groove 36b. The O-rings 44 sealingly contact the outer surface of the support 38 such that the lubricant does not come out of the clearance between the surfaces due to the vibration and thermal expansion and contraction. The ring groove can be made on the outer surface of the support 38 instead of on the flange 36 as shown in FIG. 3. In FIG. 2, the ring grooves have rectangular section, however, the ring groove may have any other configuration which can hold the O-rings 44 such that the O-rings 44 are not deformed.

Two grease grooves 36a circumferentially extend along the inner surface of the bore in the flange 36 between the two ring grooves 36b for holding lubricant. The grease grooves 36a can be provided on the outer surface of the support 38 as shown in FIG. 3. Further, only one grease groove or more than two grease grooves may be provided. In the drawings, the grease grooves 36a have V-shape section, however, they may have any other section which can appropriately hold the lubricant.

A hardened chrome plating may be provided on the outer surface of the support 38 and/or the inner surface of the bore in the flange 36. In particular, the plated outer surface of the support 38 may be finished by grinding the surface portion of the chrome plating layer.

Further, a lubricant, preferably molybdenum grease, is applied on the outer surface of the support 38, on the inner surface of the bore in the flange 36, and within the grooves 44. Another type of lubricant can be used.

The flange 36 has circumferential shoulder 36c. A spring 46 in the form of a ring is provided between the outer end face of the support 38 and the inner end face of the shoulder 36c to bias the support 38 inwardly in the axial direction.

The functional operation of the supporting arrangement for the bearing will be described.

After the motor starts, the temperature of the stator increases due to the copper loss and the iron loss there of. The temperature of the rotor also increases due to the secondary currents. In a transient condition, that is, until the temperature of the motor 10 becomes constant, there is a difference in thermal expansions of the rotor and the stator. The largest difference is between casing 12 and shaft 14 in the axial direction.

Since the support 28 is fitted into the bore in the end plate 20 without a clearance therebetween, the support 28 and the bearing 30 cannot move in the axial direction. On the other hand, the support 38 is fitted into the bore in the flange 36 with a clearance therebetween so that the support 38 and the bearing 42 can move in the axial direction to absorb the difference in the expansions of the casing 12 and the shaft 14.

After the motor 10 stops, the temperature of the motor 10 decreases by self-cooling or due to a cooling system (not shown). As when the temperature increases, a difference in the thermal contractions of the casing 12 and the shaft 14 occurs. The difference in the contractions can be absorbed by the movement of the support 38 and the bearing 42 in the axial direction.

The clearance fit between the support 38 and the bore in the flange 36 is liable to cause fretting corrosion on the outer surface of the support 38 and the inner surface of the bore in the flange 36. In order to prevent the surfaces from suffering fretting corrosion, conventionally, a lubricant is applied to the surfaces. However, in the prior art, it is impossible to prevent the lubricant from coming out of the clearance between the surfaces, which results in the development of fretting corrosion.

The O-rings 44 provided between the support 38 and the bore in the flange 36 keep the lubricant therebetween for a long time. Further, the grooves 44 between the O-rings 44 can hold sufficient lubricant to make up for any lost lubricant when the lubricant between the surfaces decreases. Keeping the amount of the lubricant at a sufficient level delays the development of the fretting corrosion.

Further, the chrome plating on the outer surface of the support 38 increases the hardness of the surface, which also delays the development of fretting corrosion.

It is further understood by those skilled in the art that the foregoing description is a preferred embodiment of the disclosed device and that various changes and modifications may be made in the invention without departing from the spirit and scope thereof.

We claim:

1. An improved supporting arrangement for a bearing in an electric motor which comprises a housing, the housing including a longitudinal axis, and bores at either end thereof so that the bores are aligned to the longitudinal axis;

a rotating shaft extending along the longitudinal axis through the bores; and bearings for rotationally supporting the rotating shaft at either end thereof, the bearings being provided within the respective bores;

in which the supporting arrangement comprises:

a support in the form of a ring for supporting the one of the bearings, into which the bearing is fitted, the support being fitted into one of the bores and slidable along the longitudinal axis;

a pair of sealing members provided between the outer surface of the support and the inner surface of the bore into which the support is fitted, the sealing members being separated from each other by an interval along the longitudinal axis;

a lubricant receiving receptacle provided between the pair of sealing members; and lubricant material applied on the outer surface of the support, on the inner surface of the bore, and into the lubricant receiving receptacle.

2. An improved supporting arrangement for a bearing according to claim 1, in which the lubricant is molybdenum grease.

3. An improved supporting arrangement for a bearing according to claim 1, in which the bearings are ball bearings.

4. An improved supporting arrangement for a bearing according to claim 1, in which the inner surface of the bore includes a pair of ring groove, circumferentially extending along the surface, for receiving the respective O-rings.

5. An improved supporting arrangement for a bearing according to claim 1, in which the outer surface of the support includes a pair of ring groove, circumferentially extending along the surface, for receiving the respective O-rings.

6. An improved supporting arrangement for a bearing according to claim 1, in which the lubricant receiving receptacle includes at least a groove circumferentially extending along the inner surface of the bore.

7. An improved supporting arrangement for a bearing according to claim 1, in which the lubricant receiving receptacle includes at least a groove circumferentially extending along the outer surface of the support.

8. An improved supporting arrangement for a bearing according to claim 1, in which chrome plating is provided on the outer surface of the support and/or the inner surface of the bore.

9. An improved supporting arrangement for a bearing according to claim 8, in which the outer surface of the support and/or the inner surface of the bore is finished by grinding the surface portion of the chrome plating layer.

10. An improved supporting arrangement for a bearing according to claim 1, in which the support is fitted into the bore with a clearance of 50 micrometers.

11. An improved supporting arrangement for a bearing according to claim 1, in which the supporting arrangement further comprises a means for biasing the support inner direction along the longitudinal axis.

12. An improved supporting arrangement according to claim 1, wherein said sealing members are O-rings.

13. An electric motor comprising a housing, the housing including a longitudinal axis, and bores at either end thereof so that the bores are aligned to the longitudinal axis;

a rotating shaft extending along the longitudinal axis through the bores;

bearings for rotationally supporting the rotating shaft at either end thereof, the bearings being provided within the respective bores;

a support in the form of a ring into which one of the bearings is fitted, the support being fitted into one of the bores and slidable along the longitudinal axis;

a pair of sealing members provided between the outer surface of the support and the inner surface of the bore in which the support is fitted, the sealing members being separated from each other by an interval along the longitudinal axis;

a lubricant receiving receptacle provided between the pair of sealing members; and lubricant material applied on the outer surface of the support, on the inner surface of the bore, and into the lubricant receiving receptable.

14. An electric motor according to claim 13, in which the bearings are ball bearings.

15. An electric motor according to claim 13, in which the lubricant is molybdenum grease.

16. An electric motor according to claim 13, in which the inner surface of the bore includes a pair of ring groove, circumferentially extending along the surface, for receiving the respective O-rings.

17. An electric motor according to claim 13, in which the outer surface of the support includes a pair of ring groove, circumferentiallly extending along the surface, for receiving the respective O-rings.

18. An electric motor according to claim 13, in which the lubricant receiving receptacle includes at least a groove circumferentially extending along the inner surface of the bore.

19. An electric motor according to claim 13, in which the lubricant receiving receptacle includes at least a groove cicumferentially extending along the outer surface of the support.

20. An electric motor according to claim 13, in which chrome plating is provided on the outer surface of the support and/or the inner surface of the bore.

21. An electric motor according to claim 20, in which the outer surface of the support and/or the inner surface of the bore is finished by grinding the surface portion of the chrome plating layer.

22. An electric motor according to claim 13, in which the support is fitted into the bore with a clearance of 50 micrometers.

23. An electric motor according to claim 13, further comprising a means for biasing the support in a direction along the longitudinal axis.

24. An electric motor according to claim 13, wherein said sealing members are O-rings.

* * * * *